(12) United States Patent
Xu et al.

(10) Patent No.: US 7,359,144 B2
(45) Date of Patent: Apr. 15, 2008

(54) OVERMOLD COMPONENT SEAL IN AN ELECTRONIC DEVICE HOUSING

(75) Inventors: Mo Xu, Singapore (SG); Johaan S. J. Koong, Singapore (SG); ChinHup Chua, Singapore (SG); KhaiYi AuYeong, Singapore (SG); KokWah Tan, Singapore (SG)

(73) Assignee: Seagate Technology LLC, Scotts Valley, CA (US)

( * ) Notice: Subject to any disclaimer, the term of this patent is extended or adjusted under 35 U.S.C. 154(b) by 408 days.

(21) Appl. No.: 11/168,283

(22) Filed: Jun. 28, 2005

(65) Prior Publication Data

US 2006/0291093 A1 Dec. 28, 2006

(51) Int. Cl.
G11B 33/14 (2006.01)
B29C 45/14 (2006.01)

(52) U.S. Cl. .............................. 360/97.02; 264/272.11; 264/271.1; 264/272.13

(58) Field of Classification Search ............. 360/97.01, 360/97.02, 97.03; 720/648; 264/271.1, 264/272.11, 272.13, 255
See application file for complete search history.

(56) References Cited

U.S. PATENT DOCUMENTS

| | | | | |
|---|---|---|---|---|
| 3,469,490 A | * | 9/1969 | Pearce, Jr. ............... | 411/371.1 |
| 3,711,347 A | * | 1/1973 | Wagner et al. ............ | 156/91 |
| 5,356,283 A | | 10/1994 | Hamada et al. | |
| 5,600,514 A | * | 2/1997 | Fukuzawa ................ | 360/99.08 |
| 5,694,268 A | | 12/1997 | Dunfield et al. | |
| 5,898,572 A | * | 4/1999 | Shennib et al. ........... | 361/713 |
| 5,970,320 A | | 10/1999 | Yamasaki et al. | |
| 6,034,841 A | * | 3/2000 | Albrecht et al. ......... | 360/97.01 |
| 6,214,412 B1 | | 4/2001 | Paulus et al. | |
| 6,277,930 B1 | | 8/2001 | Nishikawa | |
| 6,282,053 B1 | | 8/2001 | MacLeod et al. | |
| 6,426,847 B1 | * | 7/2002 | Dague et al. ............ | 360/97.01 |
| 6,469,864 B2 | | 10/2002 | Kamezawa et al. | |
| 6,600,633 B2 | | 7/2003 | Macpherson et al. | |
| 6,650,507 B2 | | 11/2003 | Nelson et al. | |
| 6,735,054 B2 | | 5/2004 | Ooi et al. | |
| 6,818,839 B2 | | 11/2004 | Hosaka et al. | |
| 6,941,640 B2 | * | 9/2005 | Neal et al. ............... | 29/603.03 |
| 7,190,548 B2 | * | 3/2007 | Neal et al. ............... | 360/97.01 |

(Continued)

FOREIGN PATENT DOCUMENTS

EP 391555 A2 10/1990

(Continued)

*Primary Examiner*—William J Klimowicz
(74) *Attorney, Agent, or Firm*—Shumaker & Sieffert, P.A.

(57) ABSTRACT

In general, the invention is directed to techniques for forming a seal between parts of an overmold component. The overmold component includes a first part forming one or more thorough-holes and a second part overmolded to the first part. A through-hole may be, for example, a screw hole or an overmold material entrance hole. The through-holes formed by the first part are surrounded by an adhesive prior to overmolding the second part. After overmolding, the adhesive locally bonds the surface of the first part to the overmold part to make a seal around the through holes. For example, the overmold component may combine with a cover to form a housing of a disc drive or other electronic device defining an internal environment. In this example, the adhesive prevents external contaminants from entering the internal environment via the through-holes.

20 Claims, 7 Drawing Sheets

U.S. PATENT DOCUMENTS

| | | |
|---|---|---|
| 2002/0141107 A1 | 10/2002 | Kasetty et al. |
| 2003/0081347 A1* | 5/2003 | Neal et al. ............... 360/97.01 |
| 2003/0179489 A1 | 9/2003 | Bernett et al. |
| 2003/0218827 A1 | 11/2003 | Teo et al. |
| 2005/0057849 A1* | 3/2005 | Twogood et al. ........ 360/97.02 |
| 2005/0088777 A1* | 4/2005 | Chee et al. ............. 360/97.01 |

FOREIGN PATENT DOCUMENTS

| | | | |
|---|---|---|---|
| EP | 712129 A1 | * | 5/1996 |
| EP | 1031608 A2 | * | 8/2000 |
| JP | 03260980 A | * | 11/1991 |
| JP | 07320474 A | * | 12/1995 |
| JP | 2002367355 A | * | 12/2002 |
| WO | WO 03012606 A2 | * | 2/2003 |

* cited by examiner

OVERMOLD COMPONENT SEAL IN AN ELECTRONIC DEVICE HOUSING

TECHNICAL FIELD

The invention relates forming a seal between parts of an overmold component in an electronic device housing.

BACKGROUND

Disc drives typically include a base to which the various drive components are mounted. A cover connects with the base to form a housing that defines an internal, sealed environment. The components include a spindle motor, which rotates one or more discs at a constant high speed. Information is written to and read from tracks on the discs through the use of an actuator assembly. The actuator assembly includes actuator arms, which extend towards the discs. Mounted on each of the actuator arms is a read/write head, which includes an air bearing slider enabling the head to fly in close proximity above the corresponding media surface of the associated disc.

Increases in storage media density have allowed disc drive manufactures to produce disc drives with large capacities, but are much smaller than disc drives generally found in desktop computers. For example, a five gigabyte disc drive having a smaller profile than a credit card, and a thickness less than a quarter-inch is currently available. A disc drive in a desktop computer may have a base formed using aluminum casting techniques. In smaller disc drives, the thickness of the base is significant to the overall thickness of the drive. Casting techniques are not easily adaptable to make the thin parts required for disc drives with such thin profiles. Consequently, to reduce overall thickness in disc drive designs, manufacturers generally use stamping techniques, e.g., press fit sheet metal over a mold, in combination with machining to form the base of a disk drive.

However, mounting various disc drive components to the base inside a disc drive requires complex features that are difficult or even impossible to form using only stamping and machining techniques. To solve this problem, some disc drive manufacturers mold features with plastic over another part, a technique known as "overmolding." An overmold component can include the detailed features necessary for a disk drive base and be designed to have a relatively thin profile compared to designs utilizing other manufacturing techniques.

Disc drives are constructed in low-humidity, clean room environments to prevent contaminants, e.g., humidity, dust etc., from entering prior to final assembly. Contaminants, including humidity, within an internal environment are detrimental to the operation of a disc drive. For example, humidity may cause read-write heads to corrode, and dust can directly interfere with operation of read-write heads. If contaminants, including humidity, enter the internal environment of a disc drive, disc drive failure and unrecoverable data loss may result. The housing of a disc drive must be sealed to keep the drive contaminant-free after final assembly. A seal is used between the cover and base forming a disc drive housing to prevent humidity and other contaminants from entering the internal environment of the disk drive.

While a seal between a disk drive base and cover is sufficient to keep humidity and other contaminants from entering the internal environment of a disk drive having a cast-metal base, a disk drive having an overmolded component for its base contains additional leakage paths that may permit external contaminants to enter the disk drive's internal environment. For example, an overmold component may contain open-ended screw holes that have an irregular shape, which prevents sealing the exit side the screw holes with dot seals. Additionally, because the thermal properties of metal and plastic are very different, thermal expansion of metal and plastic parts of an overmolded disc drive base can allow humidity and other contaminants to enter the internal environment of a disc drive. Reducing available paths for humidity and other contaminants to enter the internal environment of a disk drive would increase the reliability the disk drive.

SUMMARY

In general, the invention is directed to techniques for forming a seal between two parts of an overmold component. For example, the overmold component may combine with a cover to form a disc drive housing defining a substantially sealed environment of a disc drive. A first part of the overmold forms a through-hole, e.g., a screw hole or an overmold material entrance hole. The through-hole is surrounded by an adhesive prior to overmolding. After overmolding, the adhesive bonds the surface of the first part to the second part, forming a seal around the through-hole. For example, if the overmold component is part of a disc drive housing that defines an internal environment, the seal prevents external contaminants from entering the internal environment via the through-hole.

In one embodiment, a device includes an overmold component. The overmold component includes a first part and a second part overmolded to the first part. The first part forms a through-hole. The overmold component further includes an adhesive. The adhesive surrounds the through-hole and bonds the first part to the second part to form a seal around the through-hole.

In another embodiment, a method of manufacturing a device requires placing an adhesive to surround a through-hole. The through-hole is formed by a first part. The method also includes overmolding a second part on the first part to form an overmold component. The overmold component is for a housing that defines an internal environment of the electronic device. The adhesive bonds the first part to the second part, forming a seal around the through-hole.

Embodiments of the invention may allow for one or more advantages. For example, embodiments of the invention may prevent external contaminants, including humidity, from entering the internal environment of a disc drive or other electronic device after the manufacturing process. Preventing contaminants from entering the internal environment of a disc drive may increase disc drive reliability and prevent data loss.

The details of one or more embodiments of the invention are set forth in the accompanying drawings and the description below. Other features, objects, and advantages of the invention will be apparent from the description and drawings, and from the claims.

DETAILED DESCRIPTION

Figure 1:
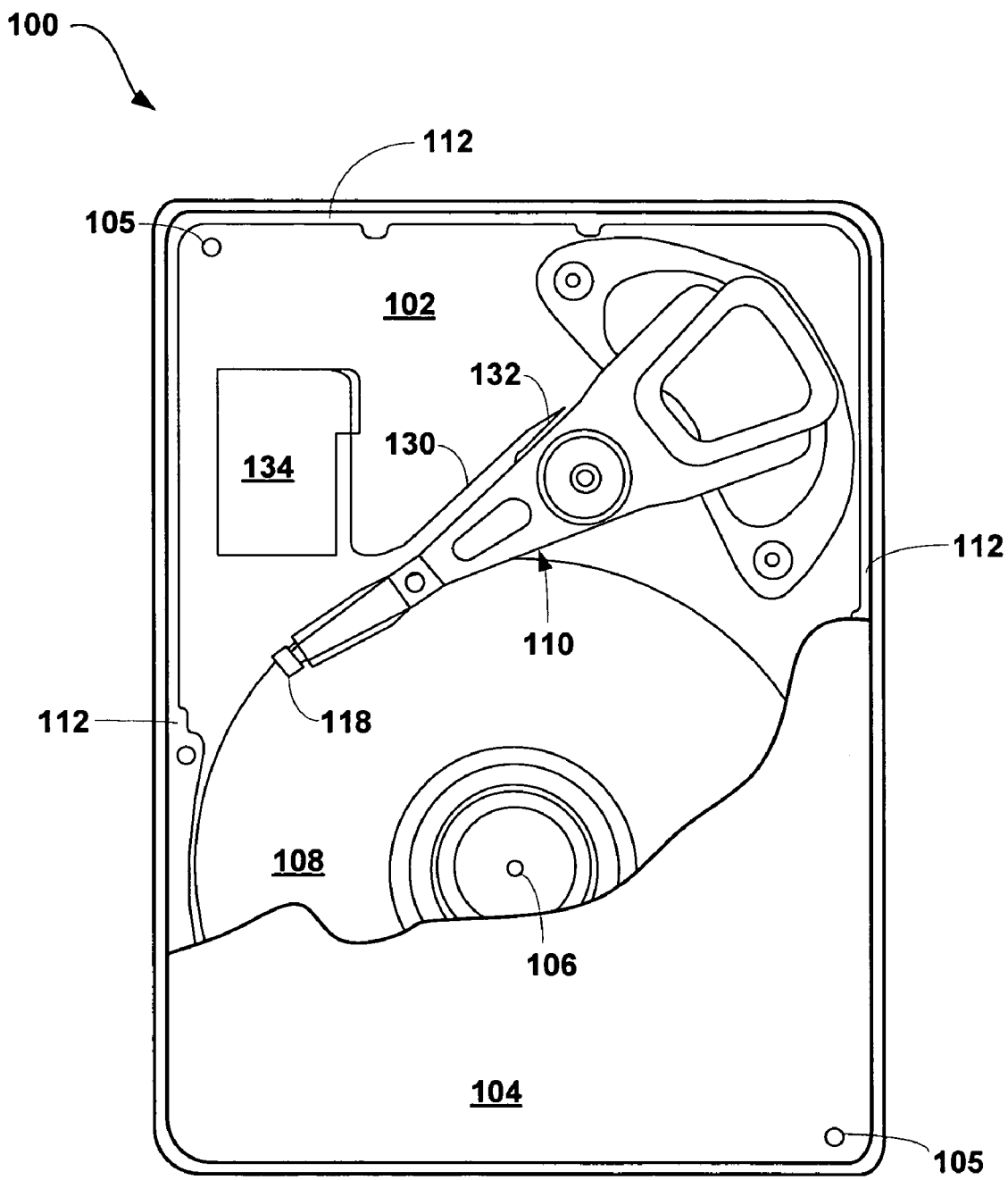
FIG. 1 is a diagram illustrating an exemplary disc drive that has an overmolded disc drive base according to an embodiment of the invention.

FIG. 1 is a diagram illustrating exemplary disc drive 100 that includes overmold component base 102 according to an embodiment of the invention. Base 102 includes a stamped metal part (not shown) overmolded with a plastic part (not shown). Cover 104, shown partially cut away, cooperates with base 102 to form a housing that defines an internal environment of disc drive 100. Disc drive 100 also includes recordable media disc 108, spindle motor 106 and actuator assembly 110 with head 118. While disc drive 100 only shows a single disc 108 and a single head 118, it may optionally include additional discs 108 and heads 118. Spindle motor 106 operates to rotate disc 108. Actuator assembly 110 pivots about bearing shaft assembly 112 moving head 118 across media tracks of disc 108. Flex assembly 130 provides electrical connection paths to control actuator assembly 110 and allows pivotal movement of actuator assembly 110 during operation. Printed circuit board 132 controls read and write operations of head 118. Flex assembly 130 terminates at flex bracket 134 for communication to a disc drive printed circuit board (not shown).

Base 102 and cover 104 form screw holes 105. Cover 104 is attached to base 102 with screws (not shown) in each of screw holes 105. Seal 112 is on the edge of base 102 and the underside perimeter of cover 104. Seal 112 engages the bottom surface of cover 104 to prevent contaminants, including humidity, from entering the internal environment of the disc drive 100 via the interface between cover 104 and base 102. For example, seal 112 may be a liquid adhesive, epoxy, tape or rubber gasket. In disk drive 100, screw holes 105 in cover 104 are covered with dot seals (not shown) on cover 104 to prevent contaminants from entering via screw holes 105 in cover 104. Screw holes 105 pass through the stamped metal part and into the overmold plastic of base 102. The bottoms of screw holes 105 are also covered with dot seals on the overmold part of base 102 to seal the internal environment of disc drive 100. As described with respect to FIGS. 3A and 3B, the interface between the overmold plastic and stamped metal parts of base 102 provide additional paths for contaminants to enter the internal environment of disc drive 100. In accordance with embodiments of the invention, these paths are also sealed as described the descriptions of FIGS. 4-6.

Figure 2A:
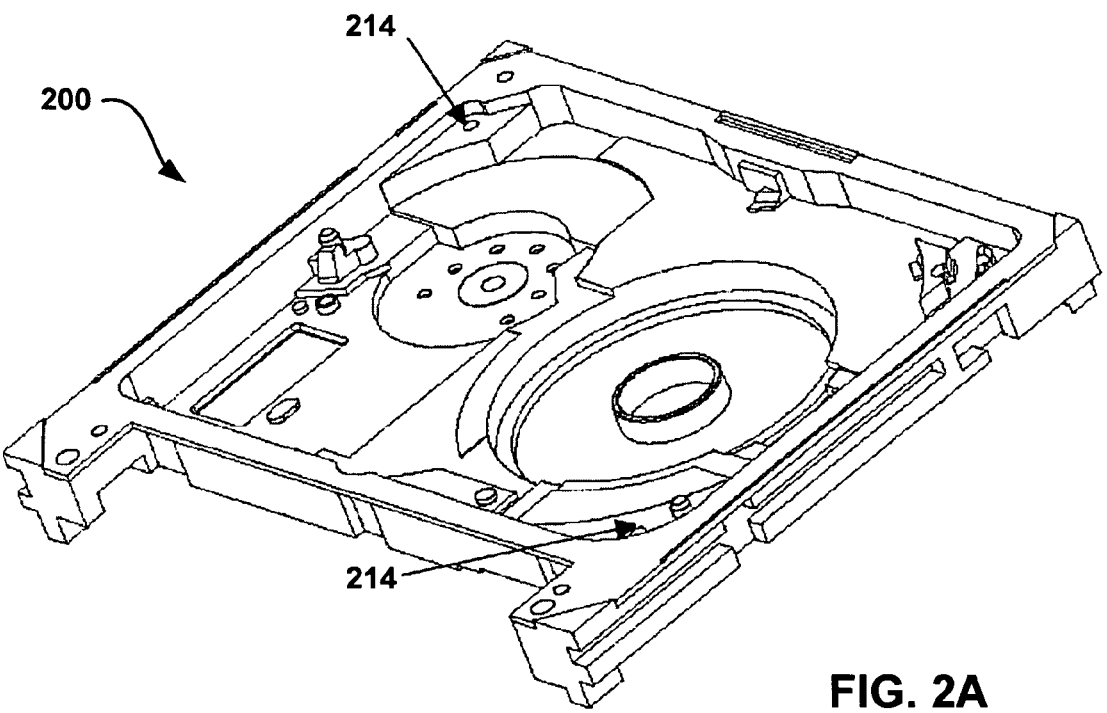
FIGS. 2A and 2B are drawings illustrating a disc drive base including an overmold component according to an embodiment of the invention.
Figure 2B:
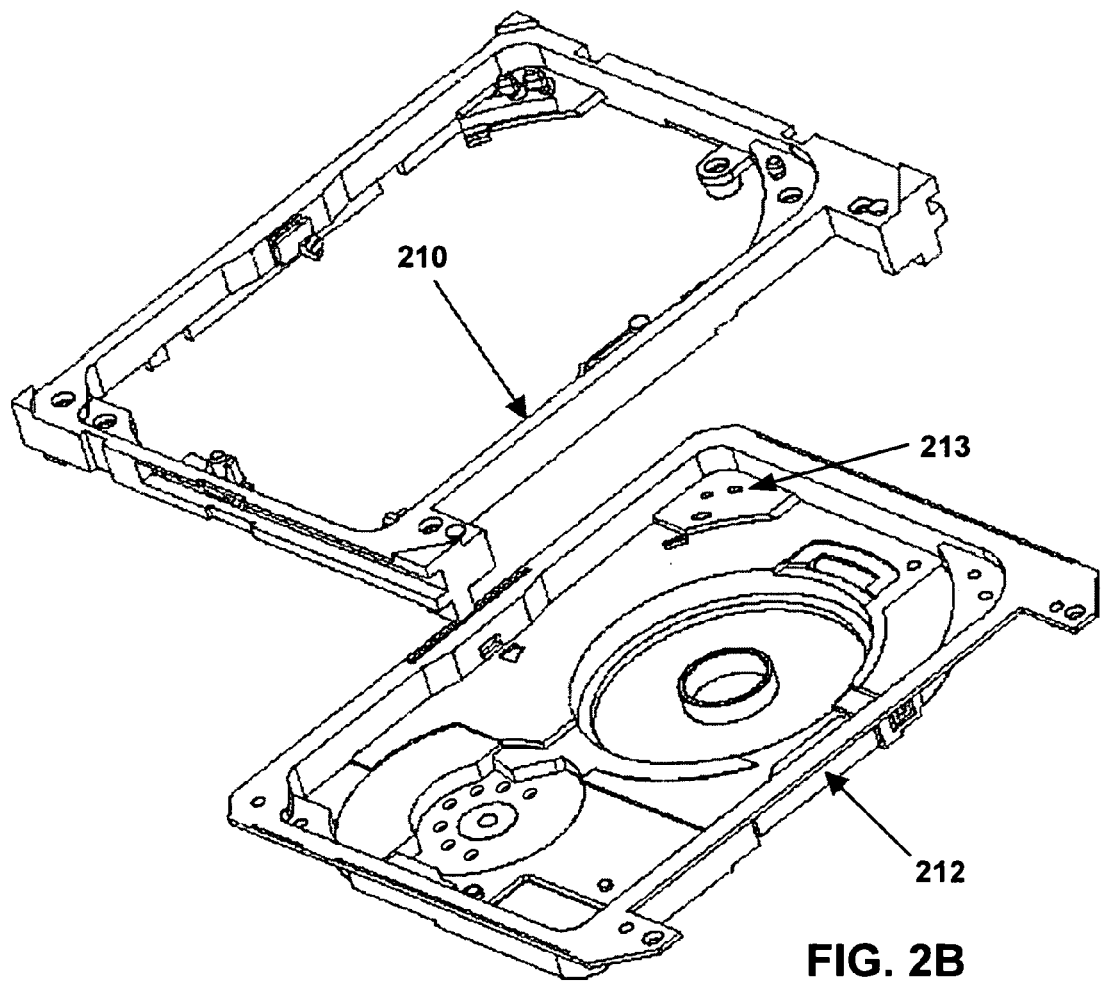

FIGS. 2A and 2B are drawings illustrating part 212 and overmold part 210 of disc drive base 200 according to an embodiment of the invention. Base 200 is an overmold component. Base 200 cooperates with a cover (not shown) to form a housing that defines an internal environment of a disc drive. For example, base 200 may be the same as base 102 in FIG. 1. Specifically, FIG. 2A shows overmold part 210 and part 212 together, as manufactured, while FIG. 2B shows overmold part 210 and part 212 separately.

Part 212 is a thin metal part, and, for example, may be formed by stamping sheet metal over a mold. Part 212 may additionally require machining to form detailed features, e.g., screw threads within each of screw holes 214. In other embodiments, part 212 may comprise a different material, e.g., plastic, formed by casting, machining, injection molding or other manufacturing method. Part 210 is an overmold and may include complex features designed to secure various internal components of a disk drive. For example, part 210 may be a plastic overmold. Part 210 may be formed by injecting plastic into a mold that includes part 212 in its post-manufactured form. In some embodiments, overmolding part 210 is the final step in manufacturing base 200. In other embodiments, additional manufacturing processes may be required after overmolding part 210 on part 212.

As shown in FIG. 2A, part 212 forms screw holes 214 to attach a cover (not shown) to base 200. Screw holes 214 are through-holes, which, in combination with minute spaces between part 212 and overmold part 210, can provide paths through base 200 for contaminants to enter an internal environment formed by base 200 and a cover (not shown). Additional paths for contaminants to enter the internal environment also exist at overmold material entrance holes 213, which allow the overmold material to pass through part 212 to form internal features on base 200. Overmold material entrance holes 213 are also through-holes. In accordance with an embodiment of the invention, an adhesive is placed around these through-hole paths before part 210 is overmolded on part 212. The adhesive forms a seal at the interface of part 210 and part 212 and prevents contaminants, including humidity, from entering the internal environment of the disc drive at through-holes in base 200.

Figure 3A:
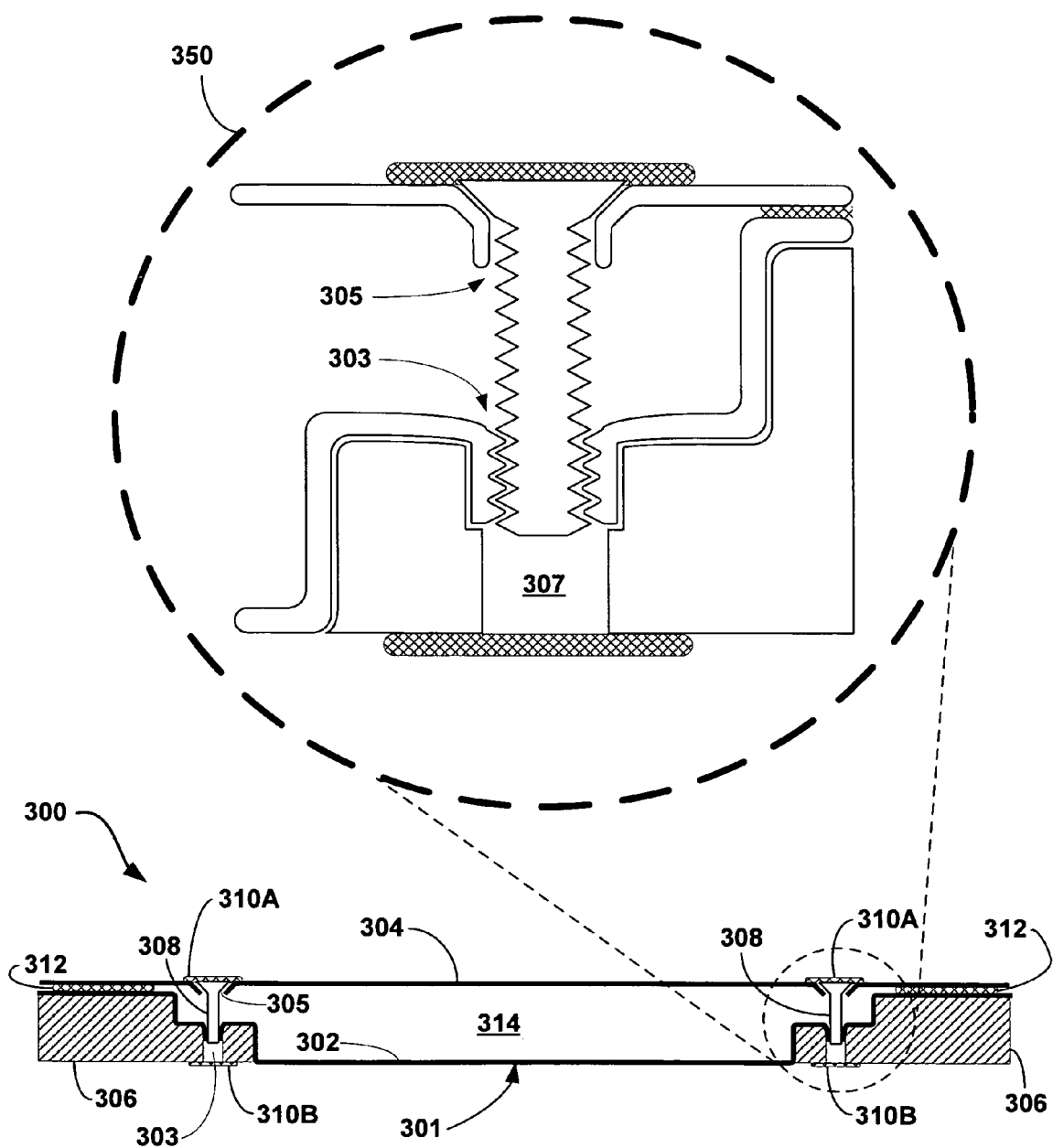
FIG. 3A is a cross-section illustration of a disc drive having a disc drive base including an overmold.

FIG. 3A is a cross-section illustration of disc drive 300 including base 301 and cover 304. FIG. 3A also includes magnification 350, which is shown in greater detail in FIG. 3B. Screws 308 connect base 301 to cover 304 to form a housing that defines internal environment 314 of disc drive 300. Base 301 is an overmold component comprising part 302 and an overmold part 306. Overmold part 306 includes internal features (not shown) of disk drive 300.

Part 302 is a thin metal part, and, for example, may be formed by stamping sheet metal over a mold. Part 302 may additionally require machining to form detailed features, e.g., screw threads 352. In other embodiments, part 302 may comprise a different material, e.g., plastic, formed by casting, machining, injection molding or other manufacturing method. Part 306 is an overmold and may include complex features designed to secure various internal components of disk drive 300. For example, part 306 may be a plastic overmold. Part 306 may be formed by injecting plastic into a mold that includes part 302 in its post-manufactured form. In some embodiments, overmolding part 306 is the final step in manufacturing base 300. In other embodiments, additional manufacturing processes may be required after overmolding part 306 on part 302.

Figure 3B:
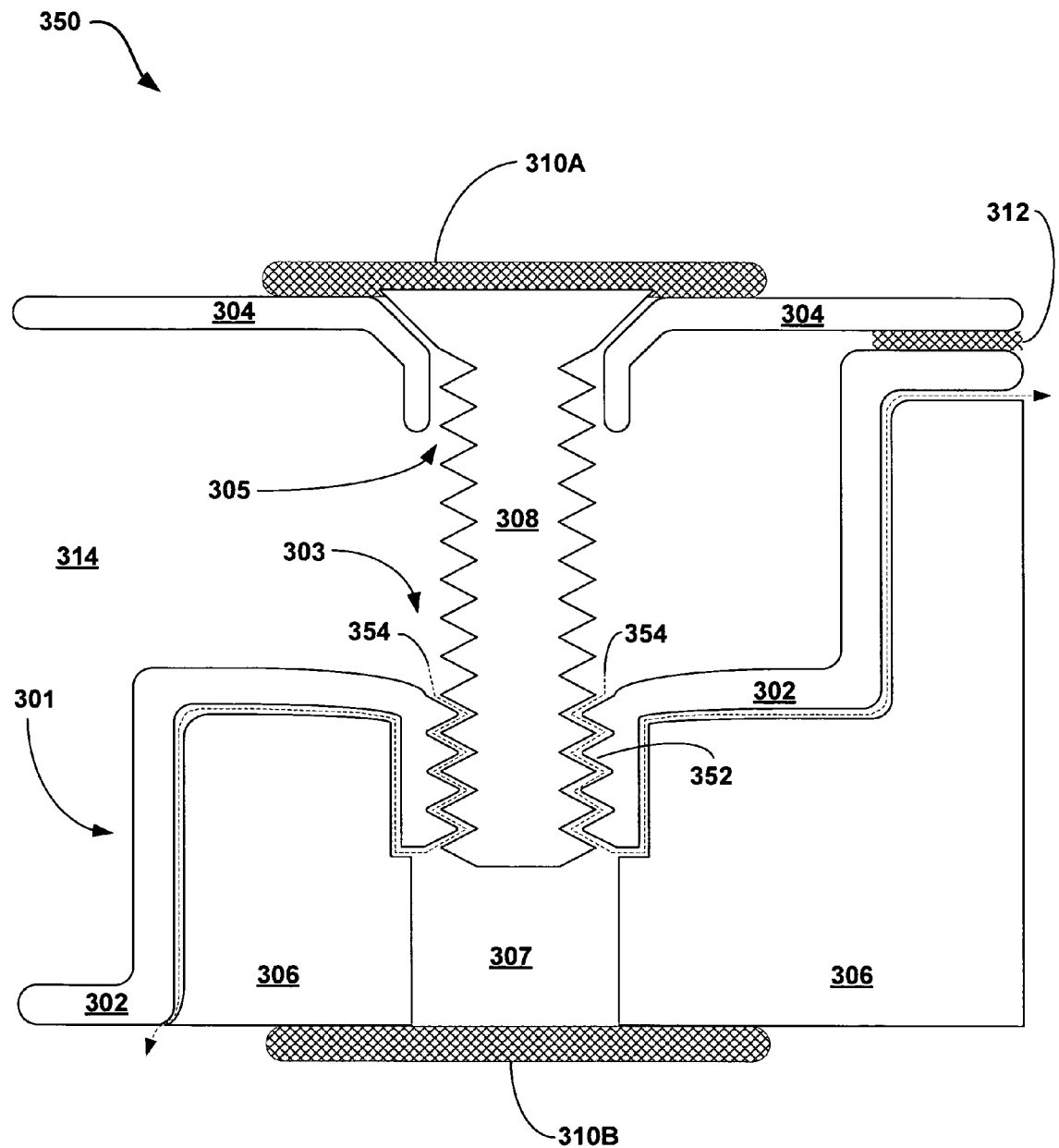
FIG. 3B is a cross-section illustration of a magnified portion of the disc drive shown in FIG. 3A showing leakage paths between the part and the overmold part of the disc drive base.

Disk drive 300 includes multiple features to prevent outside contaminants, including humidity, from entering internal environment 314. One feature, seal 312, engages the bottom surface of cover 304 to prevent contaminants from entering internal environment 314 via the interface between cover 304 and base 301. For example, seal 312 may be a liquid adhesive, epoxy, tape or rubber gasket. In addition, dot seals 310A and 310B prevent contaminants from entering around each of screws 308. However, as shown in FIG. 3B, leakage paths that exist between part 302 and overmold part 306 of disc drive base 301 can allow small amounts of outside contaminants to enter internal environment 314. Over time, these small leakage paths can allow damaging amount of contaminants to enter internal environment 314 of disc drive 300. Contaminants within internal environment 314 may eventually cause disc drive 300 to fail, resulting in permanent data loss.

FIG. 3B is a detailed illustration of magnified portion 350 of disc drive 300 shown in FIG. 3A. FIG. 3B shows potential leakage paths 354 between part 302 and overmold part 306 of disc drive base 301. FIG. 3B includes cover 304, screw 308 and disc drive base 301, which includes thin metal part 302 and plastic overmold part 306. Cover 304 forms screw hole 305. Part 302 forms screw hole 303 including threads 352 within base 301. Likewise overmold part 306 forms hole 307 in base 301.

Screw hole 305 is covered by dot seal 310A to prevent contaminants from entering internal environment 314 via cover 304. Similarly, dot seal 310B covers hole 307 to prevent contaminants from entering internal environment 314 via base 301. Base 301 is designed with hole 307 in overmold part 306 to simplify the manufacturing process. Forming hole 307 within overmold 306 prevents overmold material from entering the open-ended screw hole 303 formed by part 302 during the overmolding process. Screw hole 303 is manufactured as a through-hole because the shape of part 302 is limited by properties of sheet metal used to form part 302.

Leakage paths 354 follow minute spaces between screw 308 and screw thread 352 to a gap between part 302 and overmold part 306 in base 301. The gap between overmold part 306 and part 302 is caused by a mismatch in thermal expansion properties of the metal of part 302 and plastic of part 306. The thermal expansion properties of the two materials are significant because overmolding occurs at a temperature much higher than room temperature. The shrinkage on part 302 is different than the shrinkage on overmold part 306 as base 301 cools after overmolding.

Figure 4:
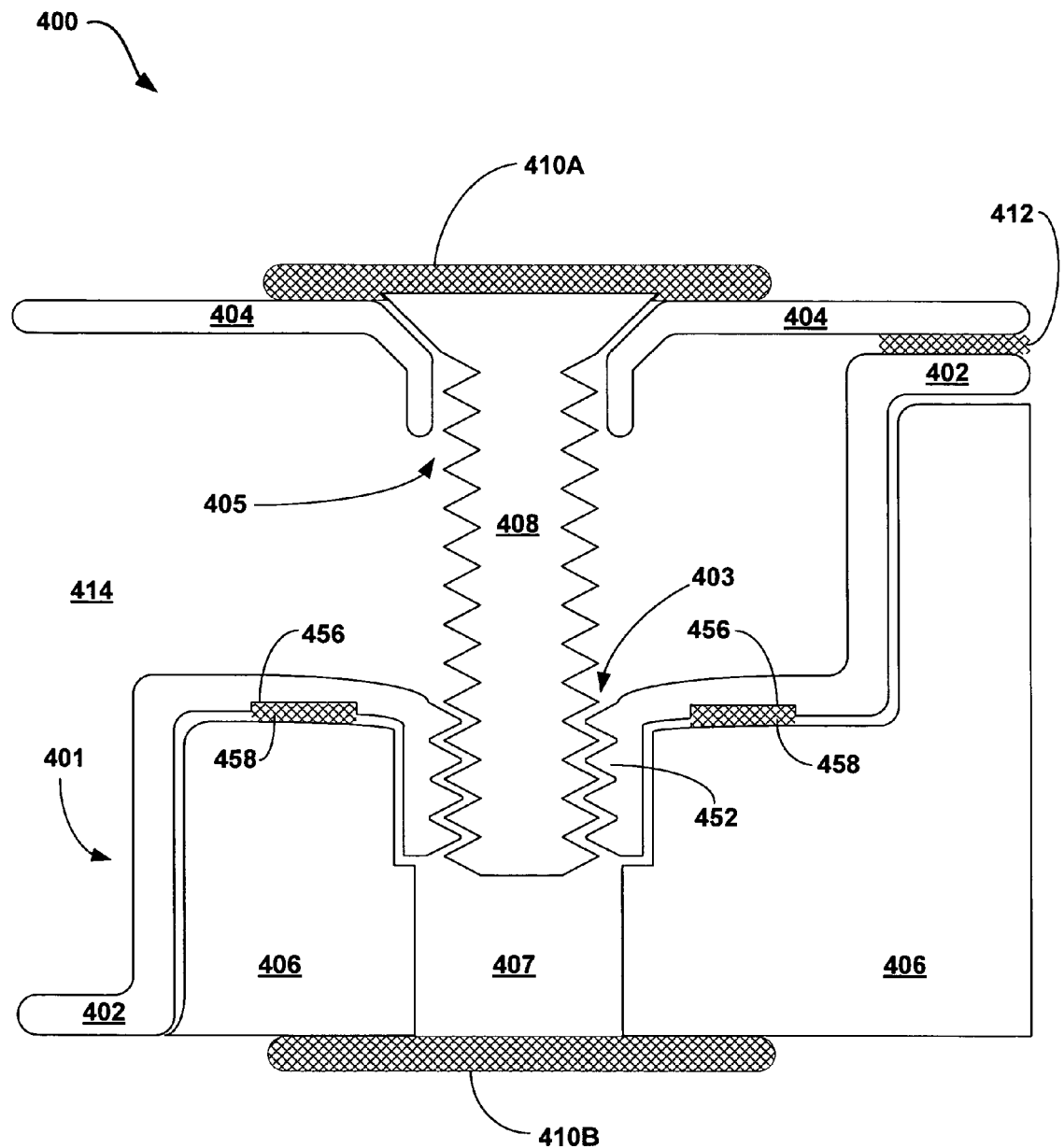
FIG. 4 is a cross-section illustration of a magnified portion of a disc drive showing epoxy-filled grooves blocking potential leakage paths between the part and the overmold component in the disc drive base according to an embodiment of the invention.
Figure 5:
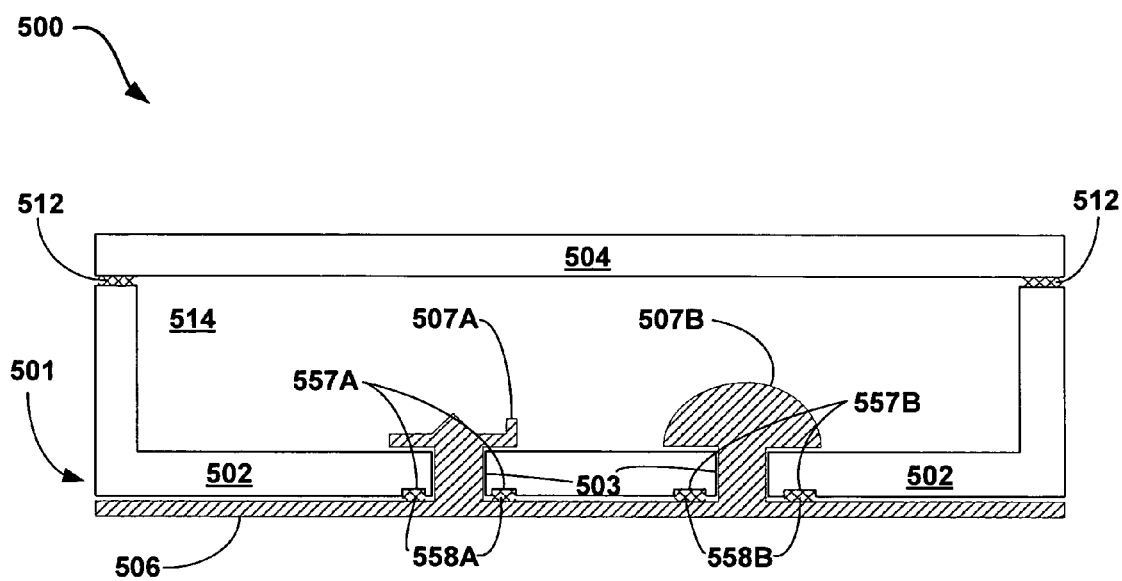
FIG. 5 is a cross-section illustration of a disk drive showing an overmold component including complex internal features and epoxy-filled grooves blocking potential leakage paths between the two part of the overmold component in the disc drive base according to an embodiment of the invention.
Figure 6:
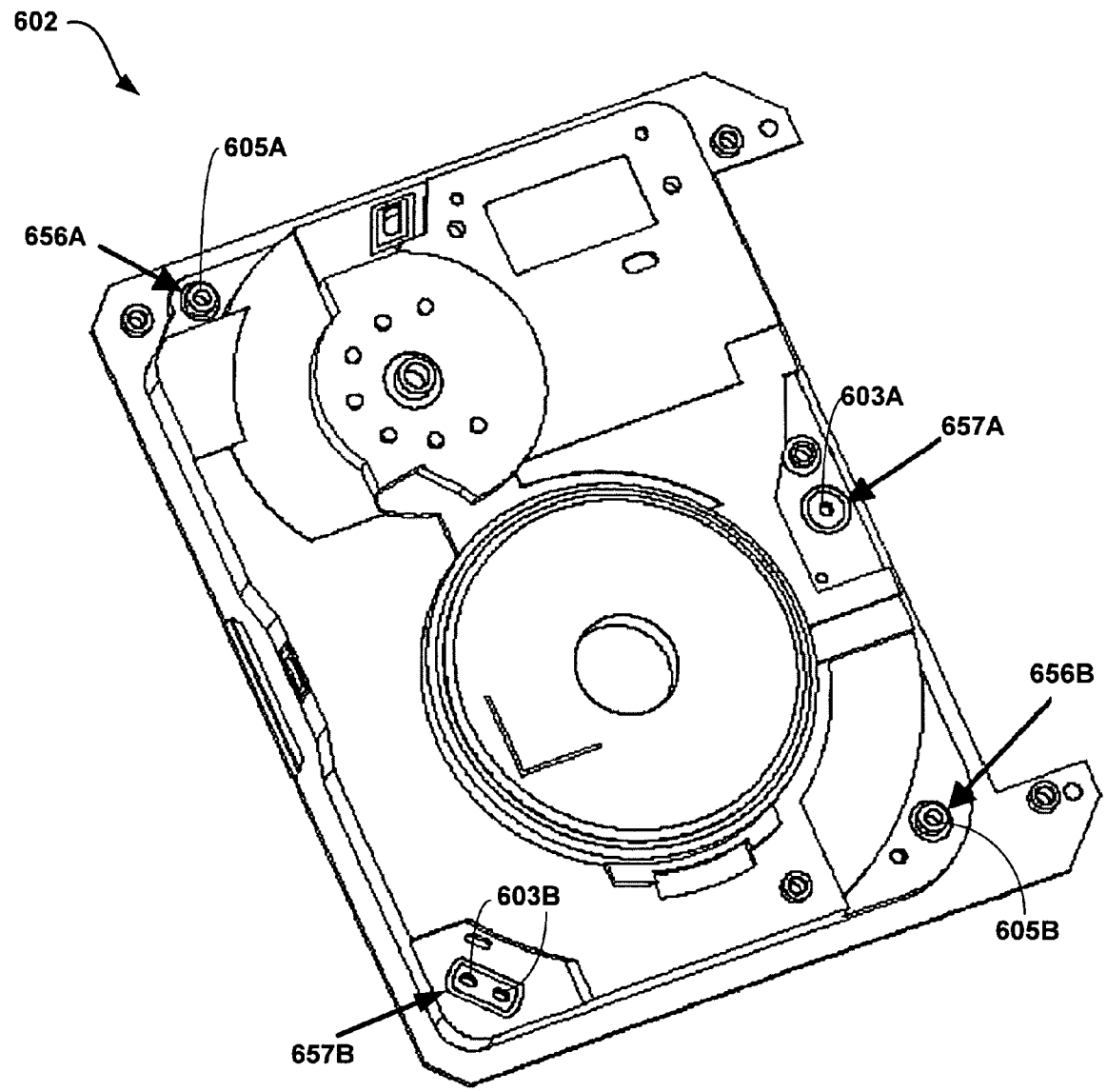
FIG. 6 is a drawing illustrating a stamped metal part for an overmolded component disc drive base and shows grooves surrounding potential leakage paths according to an embodiment of the invention.

Leakage paths 354 are not to scale and may be much smaller than shown in FIG. 3B. However, over time, leakage paths 354 can allow a significant amount of humidity and other contaminants to enter internal environment 314. Contaminants that enter internal environment 314 will interfere with the operation of disc drive 300 and may eventually cause disc drive failure and unrecoverable data loss. For example, humidity may cause read-write heads to corrode, and dust can directly interfere with operation of read-write heads. Additionally, disc drive 300 may be used in portable consumer electronics, e.g., a digital camera, which could result in disc drive 300 being exposed to external environments with relatively high amounts of contaminants. When disc drive 300 is exposed to environments with relatively high amounts of contaminants, the rate that contaminants enter internal environment 314 would increase, reducing the amount of time it would take for a significant amount of humidity and other contaminants to enter internal environment 314. An embodiment of the invention is directed to reducing or eliminating the leakage between a disc drive base and a plastic overmold. As shown in FIGS. 4-6, the leakage paths between part 302 and overmold part 306 in base 301 can be blocked by surrounding all through-holes on part 302 with an adhesive prior to overmolding part 306 on part 302.

FIG. 4 is a cross-section illustration of a magnified portion of disc drive 400 showing groove 456 including adhesive 458, which blocks potential leakage paths through base 401 according to an embodiment of the invention. FIG. 4 shows base 401 connected to cover 404 by screw 408 to form a housing that defines internal environment 414 of disc drive 400. Base 401 is an overmold component and comprises metal part 402 and overmold part 406. Overmold part 406 includes internal features (not shown) of disk drive 400 within internal environment 414.

Part 402 is a thin metal part, and, for example, may be formed by stamping sheet metal over a mold. Part 402 may additionally require machining to form detailed features, e.g., screw threads 452 In other embodiments, part 402 may comprise a different material, e.g., plastic, formed by casting, machining, injection molding or other manufacturing method. Part 406 is an overmold and may include complex features designed to secure various internal components of a disk drive. For example, part 406 may be a plastic overmold. Part 406 may be formed by injecting plastic into a mold that includes part 402 in its post-manufactured form. In some embodiments, overmolding part 406 is the final step in manufacturing base 401. In other embodiments, additional manufacturing processes may be required after overmolding part 406 on part 402.

Screw hole 405 is covered by dot seal 410A to prevent contaminants from entering internal environment 414 via cover 404. Similarly, dot seal 410B covers hole 407 to prevent contaminants from entering internal environment 414 via base 401. Base 401 is designed with hole 407 in overmold part 406 to simplify the manufacturing process of base 401. Forming hole 407 within overmold 406 prevents overmold material from entering the open-ended screw hole 403 formed by part 402 during the overmolding process. In other embodiments of the invention, a part 406 may not form a hole 407 opposite a screw hole 403 formed by a part 402, but may instead be continuous. In such embodiments, a dot seal 410B is not required. Screw hole 403 is manufactured as a through-hole because the shape of part 402 is limited by properties of sheet metal used to form part 402.

There is a gap between overmold part 406 and part 402 caused by a mismatch in the thermal expansion properties of the metal of part 402 and plastic of part 406. The thermal expansion properties of the two materials are significant because overmolding occurs at temperature much higher than room temperature. The shrinkage on part 402 is different than the shrinkage on overmold part 406 as base 401 cools after overmolding.

Disc drive 400 is identical to disc drive 300 (FIGS. 3A and 3B) with the additions of groove 456 and adhesive 458. Spaces between screw 408 and screw thread 452 allow internal environment 414 to reach hole 407 and a gap between part 402 and overmold part 406 in base 401. However, disc drive 400 does not contain leakage paths that correspond to leakage paths 354 on disc drive 330 (FIG. 3B) because adhesive 458 surrounds screw hole 403, locally bonding overmold 406 to part 402. In some embodiments, adhesive 458 is an epoxy mixture. For example, adhesive 458 may be a medium-viscosity epoxy that cures at room temperature in about twenty minutes, such that special heating or cooling equipment is not required during manufacturing processes of base 401.

Part 402 also forms groove 456, which encircles screw hole 403 and helps hold adhesive 458 in place on part 402 prior to overmolding part 406. For example, if adhesive 458 is an epoxy, it may be partially cured before the overmolding process to keep the epoxy in the correct place on part 402.

After overmolding part 406 to part 402, adhesive 458 bonds surface of part 402 to the surface of part 406, thereby sealing the entire leakage area through base 401 with respect to screw hole 403. Base 401 also includes at least one more screw hole (not shown), which is likewise encircled with an adhesive prior to overmolding part 406 to part 402. Additionally, as shown in FIG. 5, part 402 may contain overmold material entrance holes, which create additional potential leakage paths that are also encircled with an adhesive prior to overmolding.

FIG. 5 is a cross-section illustration of disk drive 500 including cover 504 and base 501, which cooperate to form a housing that defines internal environment 514. Seal 512 engages the bottom surface of cover 504 to prevent contaminants from entering internal environment 514 via the interface between cover 504 and base 501. For example, seal 512 may be a liquid adhesive, epoxy, tape or rubber gasket.

Base 501 is an overmold component and includes thin metal part 502 and plastic overmold part 506. Plastic overmold part 506 includes internal features 507A and 507B (collectively "features 507"). Internal features 507 are merely exemplary and do not represent any particular features of a disk drive. Internal features which may be formed using overmold techniques as part of an overmold component for a disc drive housing include, for example, mounting slot, filter holder and actuator crash stops. Part 506 may be formed by injecting plastic into a mold that includes part 502 in its post-manufactured form. There is a gap between overmold part 506 and part 502 caused by a mismatch in thermal expansion properties of the metal of part 502 and plastic of part 506. However, potential leakage paths through overmold material entrance holes 503 are blocked by adhesives 558A and 558B (collectively "adhesives 558") Adhesives 558 locally bond overmold 506 to part 502. In some embodiments, adhesive 558 is an epoxy mixture.

Part 502 also forms grooves 557, which encircles overmold material entrance holes 503 and helps hold adhesives 558 in place on part 502 prior to overmolding part 506. In some embodiments, part 502 may not form grooves around material entrance holes 503. In those embodiments, adhesives 558 may be placed directly on a flat bottom surface of a part 502. Grooves 557 and adhesives 558 are shown on the bottom surface of part 502. In other embodiments, adhesives 558 may be places on top surface or even within material entrance holes 503 formed by part 502. In these embodiments, adhesives 558 still function to block potential leakage paths through overmold material entrance holes 503.

For example, if adhesive 558 is an epoxy, it may be partially cured before the overmolding process to keep it in the correct place on part 402 during overmolding. After overmolding part 506 to part 502, adhesives 558 locally bond the surface of part 502 to the surface of part 506, thereby sealing the entire leakage area through base 501 with respect to overmold material entrance holes 503. Base 501 may also include one or more screw holes (not shown), which are likewise encircled with an adhesive prior to overmolding part 506 to part 502, as described in the description of FIG. 4.

FIG. 6 is a drawing illustrating part 602 for an overmold component disc drive base and shows grooves surrounding potential leakage paths according to an embodiment of the invention. Specifically, FIG. 6 shows grooves 657A and 657B (collectively "grooves 657") surrounding overmold material entrance holes 603A and 603B (collectively "holes 603") and grooves 656A and 656B (collectively "grooves 656") surrounding screw holes 605A and 605B (collectively "screw holes 605").

Part 602 is a thin metal part, and, for example, may be formed by stamping sheet metal over a mold. Part 602 may additionally require machining to form detailed features, e.g., screw threads within each of screw holes 605. In other embodiments, part 602 may comprise a different material, e.g., plastic, formed by casting, machining, injection molding or other manufacturing method. Part 602 combines with an overmold part (not shown) to form a disc drive base. Such an overmold part may be formed by injecting plastic into a mold that includes part 602 in its post-manufactured form.

Part 602 forms screw holes 605 to attach a cover (not shown) to a disc drive base consisting of part 602 and an overmold part (not shown). Part 602 also forms overmold material entrance holes 603 to allow overmold material of the overmold part to form internal features of the disc drive base. In accordance with embodiments of the invention, an adhesive is placed around these through-holes before overmolding on part 602. Additionally, if the adhesive is an epoxy, it may be partially cured before the overmolding process to keep it in the correct place on part 602 during overmolding. The adhesives form seals at interfaces of part 602 and the overmold part to prevent contaminants, including humidity, from entering the internal environment of a disc drive via the through-holes.

Grooves 656 and groove 657A are round. Groove 657B is rectangular. The shape of grooves surrounding through-holes on part 602 may vary according to different embodiments of the invention. In other embodiments, grooves that surround through-holes may be different shapes. Likewise, the positional placement of adhesive surrounding through-holes on part 602 prior to overmolding may vary according to different embodiments of the invention as long as the adhesives bond the overmold part to part 602 over an area encircling the through-holes.

Adhesives may be applied within grooves 656 and 657 with an automated machine (not shown) that produces a uniform bead of adhesive to prevent any spillage (excess) or any gaps in coverage within grooves 656 and 657. In other embodiments, adhesives may be placed on part 602 manually. In some embodiments, adhesives may be applied to larger areas surrounding screw holes 605 and overmold material entrance holes 603. However, applying adhesive to large areas on part 602 can produce distortion in a disc drive base due to the mismatch in thermal expansion properties between part 602 and an overmold part.

A number of embodiments of the present invention have been described. Nevertheless, it will be understood that various modifications may be made without departing from the spirit and scope of the invention. For example, an overmold component may form a housing for an electronic device other than a disc drive. Accordingly, other embodiments are within the scope of the following claims.

The invention claimed is:

1. An electronic device comprising an overmold component of a housing that defines an internal environment of the electronic device, wherein the overmold component includes:
   a first part forming a through-hole,
   a second part overmolded to the first part, and
   an adhesive, wherein the adhesive surrounds the through-hole and bonds the first part to the second part to form a seal around the through-hole that prevents contaminants from entering the internal environment via the through-hole.

2. The electronic device of claim 1, further comprising a cover, wherein the overmold component and the cover combine to form the housing.

3. The electronic device of claim 1, wherein the electronic device is a disc drive.

4. The electronic device of claim 1, wherein the first part forms a groove that surrounds the through-hole and the adhesive is within the groove.

5. The electronic device of claim 4, wherein the groove is a circle and the through-hole is at the center of the circle.

6. The electronic device of claim 1, wherein the through-hole is selected from a group consisting of:
   a screw hole; and
   an overmold material entrance hole.

7. The electronic device of claim 1, wherein the first part is a stamped metal part.

8. The electronic device of claim 1, wherein the second part is made from plastic.

9. The electronic device of claim 1, wherein the adhesive is an epoxy.

10. The electronic device of claim 9, wherein the epoxy is a medium-viscosity epoxy that cures at room temperature in about twenty minutes.

11. The electronic device of claim 1, wherein the first part forms a second through-hole, wherein the adhesive surrounds the second through-hole and bonds the first part to the second part to form a second seal around the second through-hole that prevents contaminants from entering the internal environment via the second through-hole.

12. The electronic device of claim 1, wherein the seal is a substantially hermetic seal.

13. A method of manufacturing an electronic device comprising:
   placing an adhesive on a first part to surround a through-hole formed by the first part; and
   overmolding a second part on the first part to form an overmold component for a housing that defines an internal environment of the electronic device, wherein the adhesive bonds the first part to the second part, forming a seal around the through-hole that prevents contaminants from entering the internal environment via the through-hole.

14. The method of claim 13, wherein the adhesive is placed on the second part with an automated machine.

15. The method of claim 13, wherein the adhesive is an epoxy.

16. The method of claim 15, further comprising allowing the epoxy to partially cure before overmolding the second part on the first part.

17. The method of claim 13, further comprising placing the first part into a mold, wherein the mold defines a shape of the second part.

18. The method of claim 13, further comprising placing the adhesive to surround a second through-hole formed by the first part, wherein the adhesive bonds the first part to the second part, forming a second seal around the second through-hole that prevents contaminants from entering the internal environment via the second through-hole.

19. The method of claim 13, further comprising mounting a cover to the overmold component to form the housing.

20. A disc drive made by the method of claim 13, wherein the internal environment is a substantially sealed internal environment.

* * * * *